United States Patent [19]
Inghilleri

[11] 3,989,933
[45] Nov. 2, 1976

[54] CONNECTION DEVICE FOR CONNECTING A STEREOCOMPARATOR TO AN ELECTRONIC COMPUTER DESIGNED TO SET UP AN ANALYTIC PHOTOGRAMMETRIC PLOTTING UNIT

[75] Inventor: Giuseppe Inghilleri, Turin, Italy
[73] Assignee: Officine Galileo S.p.A., Milan, Italy
[22] Filed: Mar. 18, 1975
[21] Appl. No.: 559,654

Related U.S. Application Data
[63] Continuation-in-part of Ser. No. 378,330, July 11, 1973, abandoned.

[30] Foreign Application Priority Data
July 12, 1972 Italy .................................. 9580/72

[52] U.S. Cl. ............................... 235/151; 33/1 A; 33/20 D; 350/136
[51] Int. Cl.² ................... G06F 3/14; B43L 13/18
[58] Field of Search .......... 235/151.3, 151; 33/1 A, 33/20 D; 353/5–7, 9; 350/136

[56] References Cited
UNITED STATES PATENTS

| | | |
|---|---|---|
| 3,068,575 | 12/1962 | Fenske et al. ................... 350/136 X |
| 3,116,555 | 1/1964 | Helava .............................. 33/20 D |
| 3,349,491 | 10/1967 | Baboz ............................... 33/1 A X |
| 3,355,807 | 12/1967 | Schoeler et al. ..................... 33/1 A |
| 3,602,592 | 8/1971 | Collins ............................. 33/1 A X |
| 3,614,410 | 10/1971 | Bailey et al. ...................... 33/1 A X |
| 3,729,830 | 5/1973 | Blachut et al. ..................... 33/20 D |
| 3,750,293 | 8/1973 | Forrest .............................. 33/20 D |
| 3,765,094 | 10/1973 | Yzerman ............................. 353/6 X |

Primary Examiner—Jerry Smith
Attorney, Agent, or Firm—Haseltine, Lake & Waters

[57] ABSTRACT

A device for connecting a stereocomparator to an electronic computer to set up an analytic photogrammetric plotter. In the control device of a stereocomparator, some of the stereoscopic exploring motions of the photograms for the plotting take place with a manual control, and an electronic, digital or analog computer receives information and elaborates the same to obtain additional data relating to at least one other motion. Apparatus is provided to translate said additional data into motion.

14 Claims, 8 Drawing Figures

CONNECTION DEVICE FOR CONNECTING A STEREOCOMPARATOR TO AN ELECTRONIC COMPUTER DESIGNED TO SET UP AN ANALYTIC PHOTOGRAMMETRIC PLOTTING UNIT

OTHER APPLICATIONS

This application is a continuation-in-part of my earlier filed copending application, Ser. No. 378,330 filed July 11, 1973 and now abandoned.

FIELD OF THE INVENTION

This invention relates to stereocomparators and to devices for coupling stereocomparators to electronic computers.

BACKGROUND

It is known that, given a pair of stereoscopic photograms of an object photographed with a camera arranged at two positions and, within appropriate limits oriented in any manner, a stereocomparator is that kind of photogrammetric instrument which allows measuring the plate coordinates ($x_1 y_1$ on the first photogram, and $x_2 y_2$ on the second photogram) which define, with respect to a system of orthogonal axes defined on the same photograms, the position of two images $I_1$ and $I_2$ corresponding to the same point P of the photographed object.

Stereocomparators furthermore include support and illumination for two photograms and two microscopes provided with a reticle or the like for binocular collimation. Members providing for relative movement are also employed between the two photograms and the two microscopes run by means of movable sliders along linear guides orthogonally arranged with respect to one another, this being in general set up by means of screws actuated by cranks and by motors.

The above-mentioned screws may form, in and of themselves, the measuring means of the coordinates, as they may be connected to devices provided with electric and electronic circuits designed to deliver pulses during the screw movement. As an alternative, said coordinates may be measured by graduated rules and sliders provided with electric and electronic circuits as above.

When the images $I_1$ and $I_2$ are collimated, the operator sees a stereoscopic image of the object and a single collimation stereoscopic mark positioned on the object in correspondence with the point P. The coordinates $x_1$ $y_1$ and $x_2$ $y_2$ of $I_1$ and $I_2$ may thus be read on graduated rules of equivalent devices.

The motions required to locate the images $I_1$ and $I_2$ on the collimation optical system axis may be set up in different ways such as:

a. The motions may be made in two plate-holders in an independent manner.

b. A plate-holder can be assembled on a carriage provided with two motions $x$ and $y$ and, on this carriage, there may be assembled another carriage provided with two motions $\Delta x$ and $\Delta y$ which locate another plate-holder. The motion of the first plate-holder determines an equal motion of the second plate-holder which, however, may in its turn be moved in two directions which are orthogonal with respect to the former motion. Briefly, the two plate-holders are mechanically connected, but one of the two may undergo movements with respect to the other. A variation of this scheme, which does not allow superimposing the two carriages, is based on the use of differentials acting on a differential rim. One determines an equal motion of the two plate-holders. The other one, while acting on the satellite of the differential, determines the motion of one plate-holder with respect to the other.

c. The motions may be made on collimation optical units in independent manner.

d. The motions may be set up on the collimation optical units in a mechanically connected manner, corresponding to what was specified under (b) above for the plate-holders.

e. The motions may be divided. The plate-holders may move in an independent manner or mechanically connected in the direction $x$, and the collimation optical units may move in an independent manner or mechanically connected in the direction $y$. Alternatively, the plate-holders may be moved in an independent manner or mechanically connected in the direction $y$, and the collimation optical units may move in an independent manner or mechanically connected in the direction $x$.

f. The motions of the plate-holders and/or of the collimation optical units may also be determined in a polar manner; that is, instead of two motions in two orthogonal directions, the movement of a plate-holder and/or of a collimation optical unit may be set up by means of a rotation and a movement according to a direction set by the same rotation.

There is also known a type of stereocomparator in which instead of the four motions $x_1 y_1 x_2 y_2$, only three motions are possible, the fourth not being required owing to the particular shape of the collimation mark being employed.

In fact, if one uses a point-form collimation mark, one obtains the stereoscopic collimation only when both marks are brought into coincidence simultaneously on the images $I_1$ and $I_2$ of the point P, both in the direction $x$ and in the direction $y$.

If one should use, on the contrary, a different and suitable form of mark, for instance, small segments or lines oriented according to the direction $y$, stereoscopic collimation would be possible also when there might not be a perfect coincidence of the images $I_1$ and $I_2$ of the point P with the two marks, but there would still remain a relatively small difference in the direction $y$, that is the operator acting on a stereocomparator having marks of said shape or form should carefully move the coordinates $x_1 y_1 x_2$ to effect the collimation on the images $I_1$ and $I_2$ of the point P and coarsely adjust the coordinate $y_2$, without however completely cancelling the parallax $y$ ($= y_2 - y_1 \neq 0$).

This operational mode produces however two drawbacks. Firstly, there is the fatigue of the operator's eye muscles. In fact, even if he does not positively perceive the residual parallax $y$ owing to the particular shape of the marks used, to set up the stereoscopic collimation of the images $I_1$ and $I_2$ of the point P, he must rotate (unconsciously) one eye upwardly and the other downwardly, continuously varying the relative position.

This motion, within a short time, leads to a substantially fatigue of the muscles which move the eyes, this being a cause of headaches and thus making it impossible for an operator to continue stereoscopic collimation work for any substantial period of time.

Secondly, there is a decrease of collimation accuracy, the accuracy of the stereoscopic collimation of the two images $I_1$ and $I_2$ of the point P relying principally on the dimensions of the collimation mark. Said collimation accuracy is very good when the collimation mark has the form of a small well defined circular ball and decreases with the increasing of the dimensions thereof.

In particular, this stereoscopic collimation accuracy decreases substantially if the mark in the stereoscopic vision assumes the form of a small stick fluctuating in space and if some of its parts appear in relief (as the mark is complete both in the right hand and left hand optical paths) and other parts thereof do not appear in relief (as the mark is complete in one of the two optical paths but incomplete in the other one).

SUMMARY OF THE INVENTION

An object of the present invention is to provide an improved mechanical-electronic apparatus to connect a stereocomparator and an electronic computer to obtain an analytic photogrammetric plotter of high precision, such as to eliminate in real time the parallax value, thus reaching a rigorous orientation on the observed point.

Another object of the invention is to provide an improved apparatus of the above-noted kind, adapted to use puncitiform collimation marks with positive advantages and precision in plotting both single points and contour lines as well as physiological advantages for the operator.

These and other further objects, which will become more apparent from the detailed description which follows hereinafter, are achieved by the provision of an apparatus connecting a stereocomparator and an electronic computer, adapted to constitute a photogrammetric analytic plotter, wherein said stereocomparator includes two optical groups of illumination and collimation elements associated with two holder carriages for two photograms, assembled movably therebetween through four entraining screws, so as to give, with respect to a system of orthogonal axes defined on the same photograms, a measure of the plate-coordinates ($x_1 y_1$ and $x_2 y_2$) of two images corresponding to one and the same photographed point, said connecting apparatus including according to the invention:

- a collimation mark in the form of a substantially small punctiform ball or spot, on each of the two optical groups;
- two manual kinematic control mechanisms to obtain displacement of equal value of the two plate-holder carriages according to the coordinate y and, respectively, displacement of equal value of the two collimation optics in the direction of coordinate $x$;
- four pulse generators, associated with each of said four entraining screws, adapted automatically to forward to the computer, for subsequent processing, pulses corresponding to the displacements of the two carriages and, respectively, of the two collimation optics;
- two step motors associated with said kinematic mechanisms for displacement of the carriages and of the optics respectively, directly coupled to said computer and such as to cause, based on information processed by the computer itself, supplementary rotations respectively of an entraining screw according to the coordinates y and of an entraining screw according to the coordinates $x$;
- a further pulse generator, which can be actuated by the operator, adapted to forward to one of said two steps motors pulses so as to cause in an entraining screw a supplementary rotation during the point-by-point plotting, said generator being deactivated during the plotting operations of contour lines;
- a keyboard instrument to control the ingress of data, set up in the keyboard, to the computer and the consequent operation of the latter;
- four displays controlled by said computer for the continuous visualization of values of plate coordinates $x_1 y_1$ and $x_2 y_2$ measured by said four entraining screws; and finally
- a plotting table of known type, provided with step motors controlled by the computer and adapted to induce displacements on the carriages $x$ and $y$ of the table, thus allowing the drawing of planimetries and contour lines.

In the instrument of the invention, for the stereoscopic collimation at images $I_1$ and $I_2$ of the point P, there are used small-size point-like marks with the aim of obtaining maximum collimation accuracy while some of the motions of the stereoscopic scanning for the plotting are effected with a manual control and a digital or analog electronic computer receives the information and elaborates it to obtain additional data relating to at least one other motion. Furthermore, means are provided to translate said additional data into motion.

The stereoscopic scanning motion for the plotting of single points takes place with a manual control for the three motions, and by means of elaborated information imposed by the computer on a suitable servo-mechanism in relation to the fourth motion ($y_2$). Eliminating, thus, the parallax y, one sets up the orientation of the pattern in correspondence with each point P, as the points are observed.

Alternatively, in another application, the stereoscopic scanning motion, for the plotting of a given height level curve, takes place by means of a control effected by hand in relation to the two motions $x_1$ and $y_1$ and by means of elaborated information imposed by the computer on suitable servo-mechanism for the other two motions ($x_2$ and $y_2$).

There are known devices for the plotting of level curves (which in their assembly represent the height or altimetric level of the ground to be plotted) in which there is provided a feed-back which, comparing the level curve heights selected and introduced into the computer with the one presently given back or plotted by the operator, indicates a correction to be imparted to the motion $x_2$ of the stereocomparator until the plotted height is the same as the selected one. Said correction may be manually introduced by the operator, or suitable mechanisms may be provided to effect the motion in an automatic manner.

In the instrument of the invention, the operator effects the motions $x_1$ and $y_1$, whose values or rates are automatically forwarded to the computer and are elaborated by the latter, together with the value of the curve height selected and introduced into the computer in such a manner as to derive the values of the coordinates $x_2$ and $y_2$ and effect the corresponding motions of the stereocomparator by means of appropriate servo-mechanisms. Thus, one simultaneously obtains both the elimination of parallax and the condition that the points of the ground situated at the horizontal plane of the height selected and introduced into the computer are collimated.

It should be noted that the operator of the instrument, in order to collimate the images $I_1$ and $I_2$ and thus determine the corresponding coordinates $x_1, y_1, x_2, y_2$, must act (manually or by interposed motor) on four handwheels which determine, whatever the mechanical structure of the stereocomparator, four motions including those of the plate-holders and of the collimation optical units or, in any divided manner, of the plate-holders and of the collimation optical units. Also, after having set up the collimation of images $I_1$ and $I_2$ of the point P, the operator to collimate images $I_1$ and $I_2$ of another point P' must act with four motions, being in condition to reduce the number of the imposed motions only in the case of a flat or planar object or those photographed in nadir conditions, which are never present, especially in air photogrammetry.

The device of the present invention relates moreover to a particular connection of a stereocomparator to an electronic digital or analog computer, set up in such a manner as to leave three of the four motions to the operator's manual control, automatically setting up the fourth motion and translating the information elaborated by the computer into a motion. Thus, for instance, the collimation of the point P may be made by means of the manual motions $x_1, y_1, x_2$ while the motion $y_2$ is supplied by the computer.

This type of connection allows the setup of an analytic photogrammetric plotting device, in which the information is forwarded to the computer by the three manual setups, so that the latter may elaborate the information which determines the fourth motion, while also allowing determination of the coordinates X,Y,Z of the collimated point with respect to an intrinsic reference to the photographed object (plotting of a point). The calculated coordinates X,Y,Z may be read on displays and supply the information for the operation of a plotter or a plane tracer, which allows the graphic plotting on a drawing sheet of the planimetric positions of the photographed point, that is, to make a paper of the object in scale.

Such a connection device, however, would allow only the point-point plotting of the object, whereas in a conventional photogrammetric plotter, the operator has the possibility of locating a contour line of the photographed object, that is the intersection line between the object and a plane Z = constant.

In order to obtain this possibility in the connection device of the invention, it is necessary to provide for a follow-up to the computer of a second motion. Thus, if for the point-point plotting, there is provided the follow-up of a motion y, for the location of the level curves it is necessary to provide for the follow-up also of a motion x, or vice-versa if for the point-point plotting there is provided for the follow-up of a motion x, for the location of the contour line, one must provide for the follow-up also of a motion y.

In the plotting of a contour line, the operator thus determines by a manual operation two of the four motions while the computer determines the other two. The counter line is located if the operator acting on the two available causes the floating mark (resulting from the fusion of the two actual marks) to move, remaining always adherent to the object stereoscopic image.

BRIEF DESCRIPTION OF DRAWING

In the accompanying drawing which illustrates principle schemes and embodiments of the invention.

DETAILED DESCRIPTION

Hereinafter, the fundamentals of the theory are defined on which the particular connection between the stereocomparator and the electronic computer is based. The characteristics of the stereocomparator-computer connection, intended to establish an analytic plotter, are dictated by the results of a theory of analytic photogrammetry of which the outlines are briefly hereafter stated.

Figure 1:
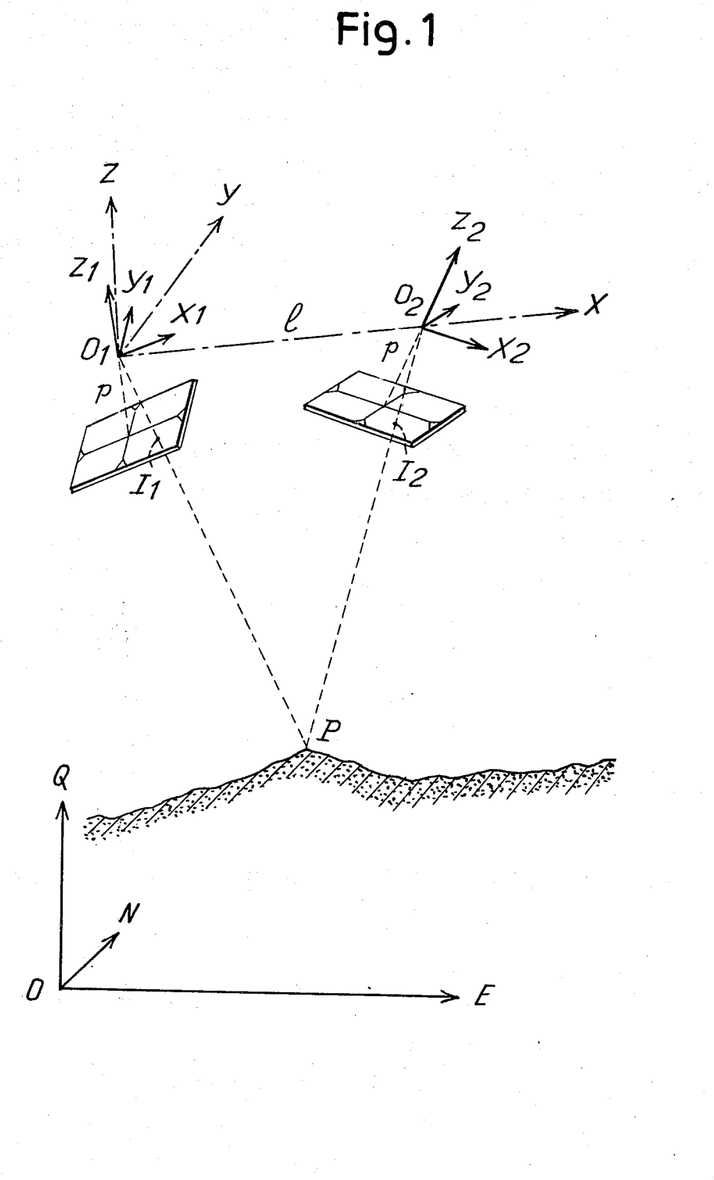
FIG. 1 illustrates a principle of the invention.

In FIG. 1, at $0_1$ and $0_2$ are indicated the shooting points of the photograms; $p$ is the principal distance of the camera (focus length), the set $0_1, x_1, y_1, z_1$ has its origin at $0_1$, the axis $z_1$ coinciding with the axis of the camera and the axis $x_1, y_1$ being parallel to the axis located on the photogram by the same four references. Mutatis mutandi, the same may be stated for the set $0_2, x_2, y_2, z_2$. $l$ indicates the length of the segment $0_1 0_2$. A set $0_1$, XYZ has its origin at $0_1$, the axis X being coincident with the straight line between $0_1 0_2$ and the plane XX containing the axis $z_1$, so as to provide certain simplifications of the calculation. The photographed object is referred to the set ENQ.

It is known from theory that as between the plate coordinates $x_1 y_1$ and the plate coordinates $x_2 y_2$ there is the equation:

$$\frac{a_{12}x_1 + a_{22}y_1 + a_{32}p}{a_{13}x_1 + a_{23}y_1 + a_{33}p} = \frac{b_{12}x_2 + b_{22}y_2 + b_{32}p}{b_{13}x_2 + b_{23}y_2 + b_{33}p} \quad (1)$$

where $a_{ij}$ are six of the nine directing cosines which define the orientation of the set $0_1 x_1 y_1 z_1$ with respect to the set $0_1$XYZ and $b_{ij}$ are six of the nine directing cosines which define the orientation of the set $0_2 x_2 y_2 z_2$ with respect to $0_1$XYZ.

It is obvious that from (1) one may calculate the value of $y_2$ as a function of $x_1, x_2 y_1 z_1$ and $z_2$, once there are known the director cosines $a_{ij}, b_{ij}$ and the principal distance $p$. The analytic procedures to calculate the director cosines are known. Therefore, if in the computer member there are available the values of the director cosines and the value of the distance $p$, and if the digitalized information relating to the values $x_1, y_1$ or $x_2$ are admitted with appropriate electronic interfaces into the computer, with a calculator program one may work out $y_2$, and, so by means of another interface, send the information $y_2$, suitably transformed into an analog quantity to the photogram-holder (or to the collimation optical unit) of the stereocomparator.

One can also demonstrate that the coordinates of the point P with respect to the set 0 XYZ, indicating with $l$ the distance between $0_1 0_2$, may be calculated with the formulae:

$$z_p = \cfrac{l}{\cfrac{x_1a_{11} + y_1a_{21} - pa_{31}}{x_1a_{13} + y_1a_{23} - pa_{33}} - \cfrac{x_2b_{11} + y_2b_{21} - pb_{31} - l}{x_2b_{13} + y_2b_{23} - pb_{33}}}$$

$$X_p = \frac{Z_p(x_1a_{11} + y_1a_{21} - pa_{31})}{x_1a_{13} + y_1a_{23} - pa_{33}}$$

$$Y_p = Z_p \frac{x_1a_{12} + y_1a_{22} - pa_{32}}{x_1a_{13} + y_1a_{23} - pa_{33}} \quad (2)$$

and with respect to 0. ENQ. with the formulae:

$$E_p = \lambda[X_p c_{11} + Y_p c_{21} + Z_p c_{31}] + E_{01}$$
$$N_p = \lambda[X_p c_{12} + Y_p c_{22} + Z_p c_{32}] + N_{01} \quad (3)$$
$$Q_p = \lambda[X_p c_{13} + Y_p c_{23} + Z_p c_{33}] + Q_{01}$$

where $\lambda$ is a scale factor, $c_{ij}$ are the director cosines of the set $0_1$ XYZ with respect to the 0. ENQ and $E_{01}$, $N_{01}$, and $Q_{01}$ are three translations.

The procedures which allow calculating the director cosines $c_{ij}$, the factor $\lambda$ and the translations are known.

As in the computer, said data are available — having been preliminarily set up — and there are all the elements for the calculation of $E_p$, $N_p$, $Q_p$. Said coordinates may be used for the operation of a plotter as above stated. The series of calculations made by the computer and relating to the formulae (1), (2) and (3) must be effected with a remarkable quickness as the values of $y_2$, $E_p$, $N_p$, $Q_p$ must be available, for proper operation, within a small fraction of a second from the instant at which the information $x_1$, $y_1$, $x_2$ are admitted into the computer.

For the location of the level curves, the procedure is the following:

Setting up the height $Q_c$ of the curve, one obtains from the last of the (3):

$$X_p c_{13} + Y_p c_{23} + Z_p c_{33} = \frac{Q_c - Q_{01}}{\lambda}$$

whereby: taking account of (2) and supposing $$K = \frac{Q_c - Q_{01}}{\lambda} \frac{x_2 b_{11} + y_2 b_{21} - pb_{31} - l}{x_2 b_{13} + y_2 b_{23} - pb_{33}} = \frac{x_1 a_{11} + y_1 a_{21} - pa_{31}}{x_1 a_{13} + y_1 a_{23} - pa_{33}} \left(1 - \frac{c_{13} l}{K}\right) -$$

$$\frac{c_{23} l}{K} \frac{x_1 a_{12} + y_1 a_{22} - pa_{32}}{x_1 a_{13} + y_1 a_{23} - pa_{33}} - \frac{c_{33} l}{K}$$

which with (1) forms a system of two equations with respect to the two unknown values $x_2$, $y_2$ since one supposes $x_1$ and $y_1$ as known.

Figure 2:
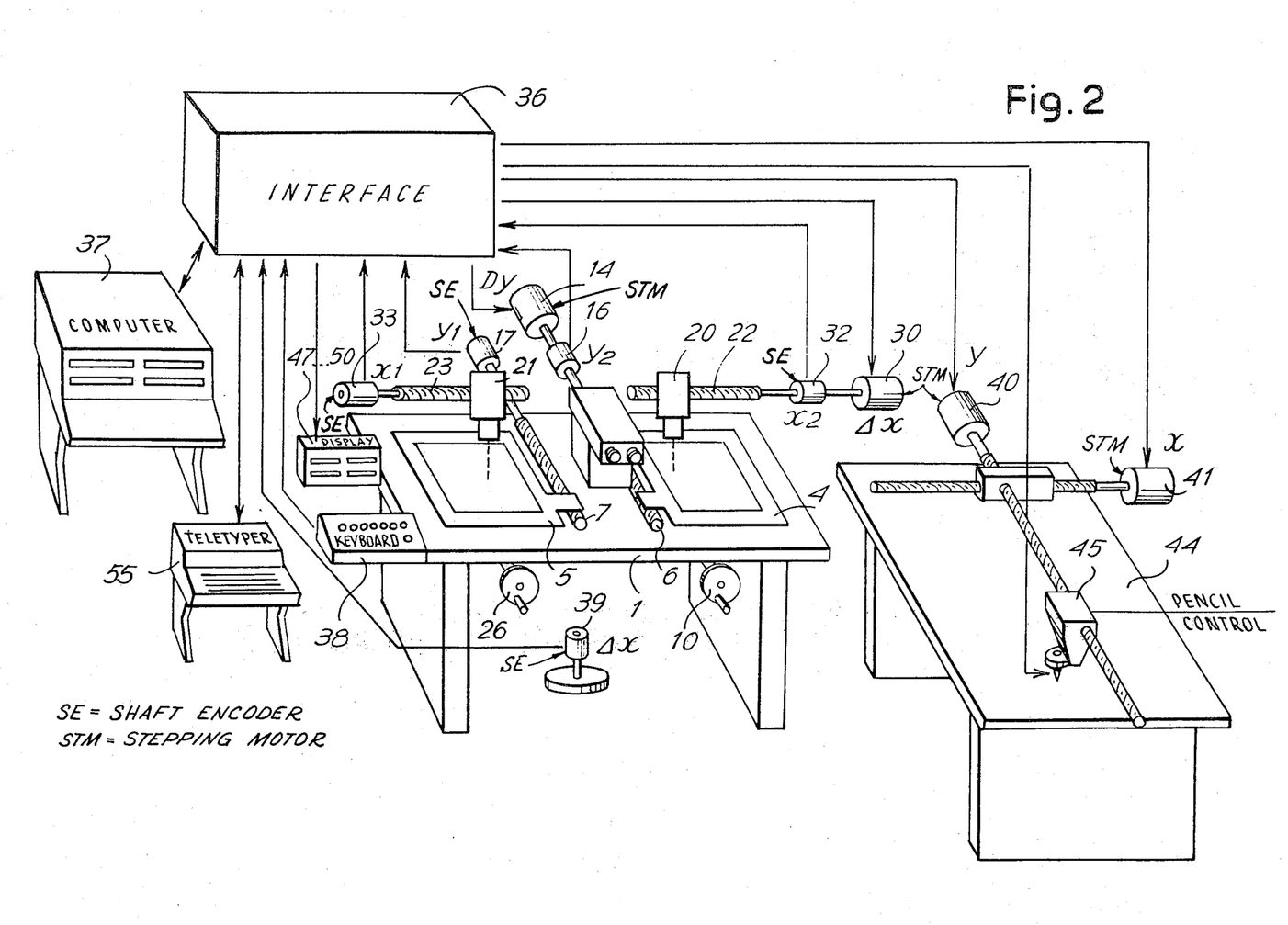
FIG. 2 diagrammatically illustrates a stereocomparator and computer of the invention with associated interfaces and accessory members (keyboard, displays, telex machine and drawing table)
Figure 3:
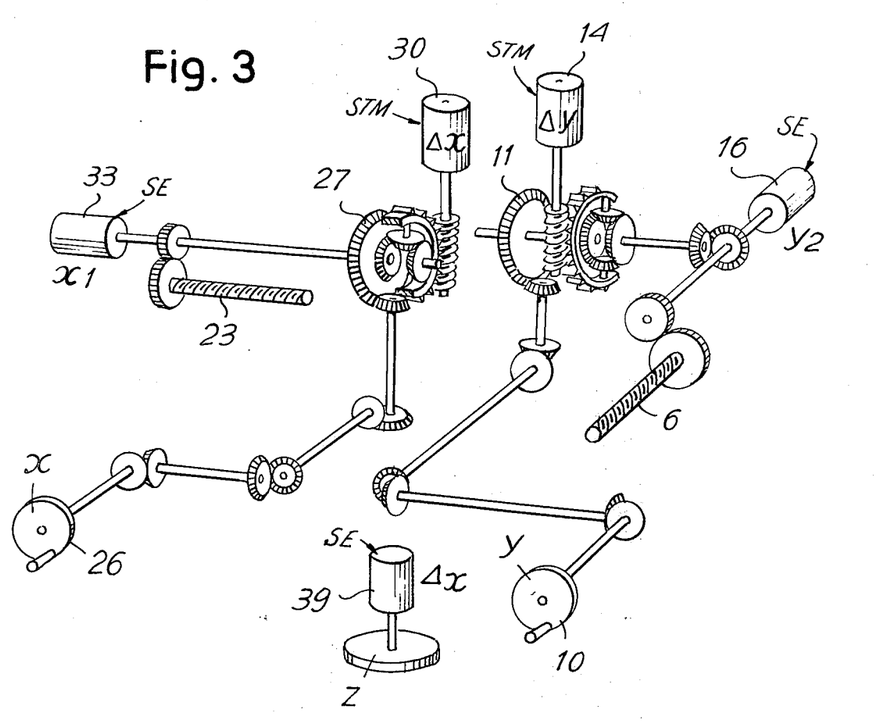
FIG. 3 illustrates a kinematic partial embodiment of the motions x and y.
Figure 3A:
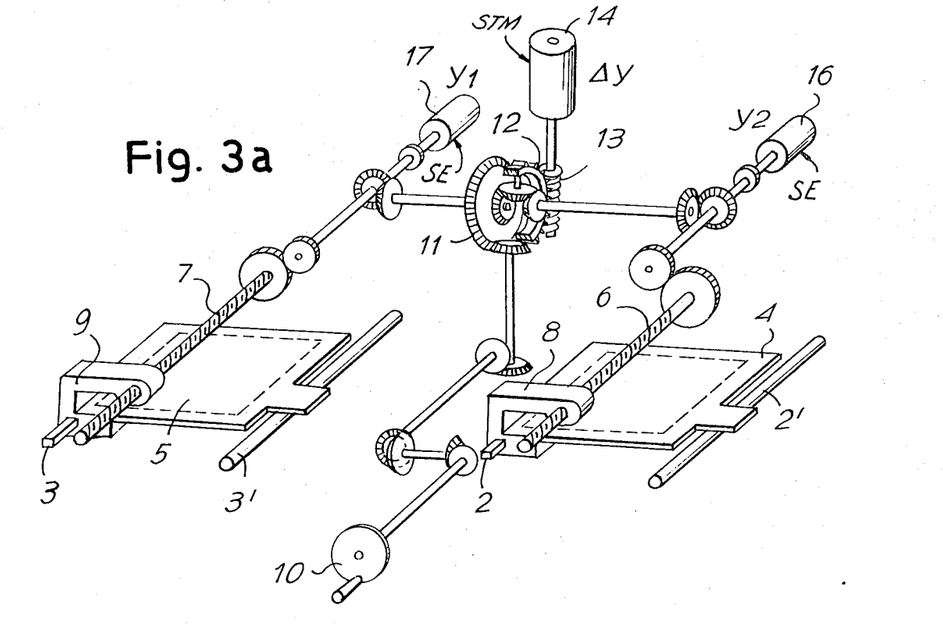
FIG. 3a illustrates a kinematic embodiment of the motions y.

Next, the device to set up the aforegoing is described. In FIGS. 2, 3, 3a and, 3b are emphasized the connections between the three main parts (stereocomparator, the electronic computer, and the drawing table) and one of the possible structural modes previously indicated.

The stereocomparator 1 is formed with a metal base, which rests on three legs, provided with levelling screws, and supports a cross-bridge containing the optical collimation systems. Two pairs of ways or guides 2 and 2', 3 and 3' are fixed on the base 1 and, on said ways, slide the two plate-holder carriages 4 and 5 which are moved by screws 6 and 7 by means of worms 8 and 9. The motion is controlled by the operator by means of the hand-wheel 10 which acts, with appropriate mechanical connections, on differential rim or crown 11. As the satellite-holder 12 is kept still by means of the worm screw 13 by the step motor 14 (when the controls do not arrive from the computer), the motion imposed by the handwheel 10 is forwarded in the same extent to the two screws 6 and 7 and thus to the two plate-holders 4 and 5 which are moved in a concordant way by the same extent in the direction y.

Figure 5:
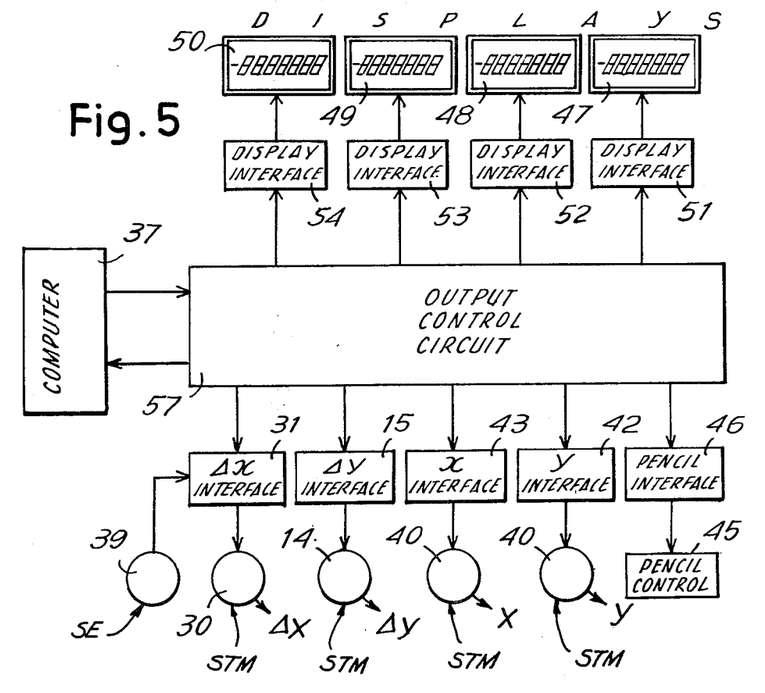
FIG. 5 is a block diagram of the outputs.

When the stepping motor 14 receives pulses from the computer by means of the electronic interface 15 (FIG. 5) through the worm screw 13, the satellite-holder 12 is rotated and rotates the right hand screw 6 by a supplemental amount, with respect to the one operated by the handwheel 10.

Figure 4:
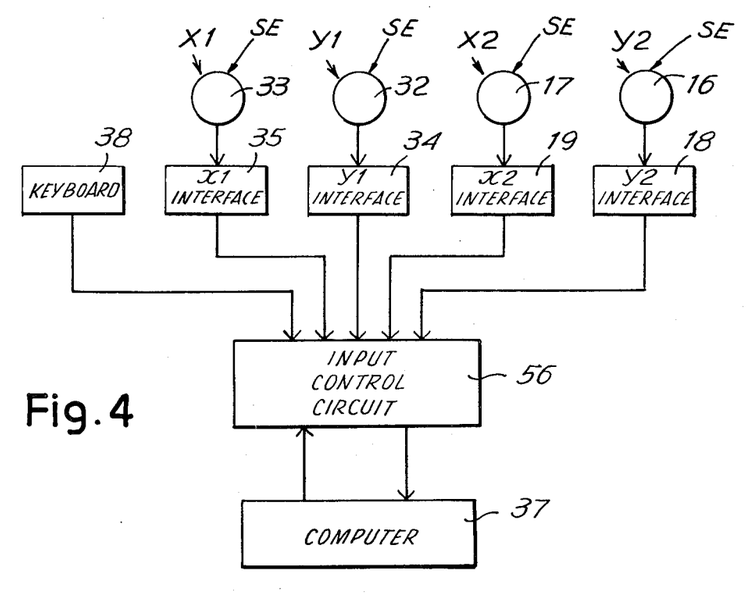
FIG. 4 is a block diagram of the inputs.

The screws 6 and 7 at the same time induce movement of the plate-holder carriages 4 and 5 and measure the movements thereof, and forward the values of the movements measured, by means of the shaft encoders 16 and 17, to which they are mechanically connected, to the computer passing through the electronic interface 18 (FIG. 4).

Similarly, on the upper bridge slide two observation microscopes 20 and 21 (FIG. 3b) having punctiform collimation marks 20' and 21' and moved by the screws 22 and 23 by means of the worms 24 and 25. The motion is effected by the operator through the handwheel 26 which acts with suitable mechanical connections on the differential rim 27. The satellite-holder 28 being kept still by means of the worm screw 29 of the stepping motor 30 (when the controls do not arrive from the computer), the motion imposed by the handwheel 26 is forwarded in the same extent to the two screws 22 and 23 and thus the two microscopes 20 and 21 are moved in concordant way by the same extent in the direction x.

Figure 3B:
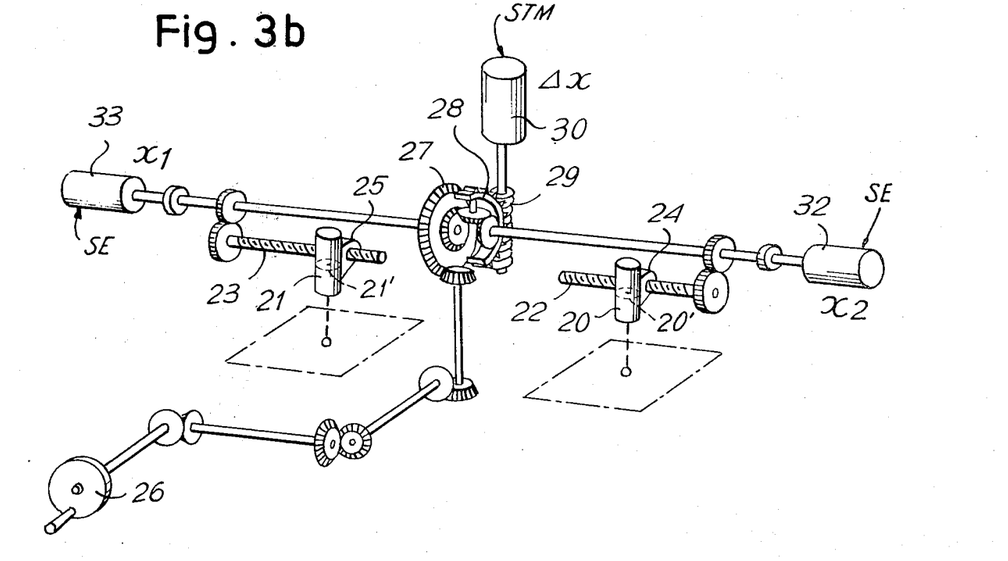
FIG. 3b illustrates a kinematic embodiment of the motions x.

When the stepping motor 30 receives pulses from the computer by means of the electronic interface 31 (FIG. 5), through the worm screw 29, it rotates the satellite-holder or carrier 28 and rotates the right hand screw 27 by a supplemental amount with respect to the one operated by the handwheel 26.

The screws 22 and 23, at the same time inducing the observation microscopes 20 and 21 into movement, measure the movements thereof and forward the values of the measured movements by means of the pulse generators 32 and 33, to which they are mechanically connected, to the computer passing through the electronic interface 34 and 35.

It is to be noted that owing to that previously stated, two differentials are not essential for the operation and only represent a particular embodiment, as it is only essential that the two shots or photograms may have assembly motions in the two directions x and y and that the differential motions $\Delta x$ and $\Delta y$ be possible (one must always remember that with the symbology x y $\Delta x$ $\Delta y$, one always means coordinates-plate).

The interface 36 is constituted by electronic circuits which allow connections to the computer 37 of the external equipment. These are formed by the following data input members:

a. four shaft encoders 16, 17, 32, 33 located on the stereocomparater 1 and which transmit the measurements of the coordinates $y_2, x_2, y_1, x_1$, respectively measured by the screws 6, 7, 22, 23 to the computer by means of the interface circuits 18, 19, 34, 35.

b. a keyboard 38 with seven switches by means of which the data input or ingress is controlled. A pushbutton is associated with the keyboard, and upon a pressing of said button, the data imposed on the keyboard is picked up by the memory and forwarded to control the computer.

Figure 6:
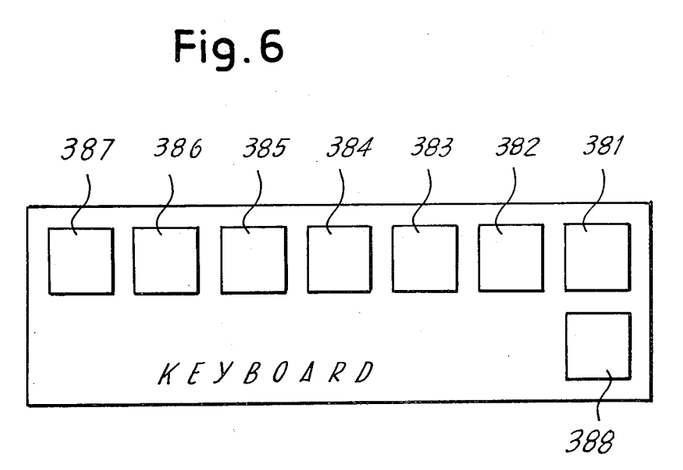
FIG. 6 illustrates a keyboard.

With reference to FIG. 6, by action on the push-buttons of keyboard 38, several operations are obtained. In particular, by pressing:

key 381, the storing operation is selected;
key 382, the cancelling of possibly erroneous data is selected;
key 383, the operation of inner orientation is selected;
key 384, the operation of relative orientation is selected;
key 385, the operation of absolute orientation is selected;
key 386, the plotting operation is selected;
key 387, the data recording operation is selected;
pushbutton 388, the execution of the operations defined on the previous keys is effected.

c. a shaft encoder 39, controlled by the operator by means of a pedal, sends pulses to the stepping motor 30 by means of the interface 31, thus inducing a supplementary rotation to the screw 22 and thus modifying the parallel $\Delta x$ when, during the point-point plotting, the operator collimates subsequent points which are located at different heights. When the operator effects the plotting for contour lines, the electronic connection between the shaft encoder 39 and the stepping motor 30 is interrupted by the interface 31.

The following data output members are added to the aforesaid data ingress members;

d. two stepping motors 14 and 30 operated by the computer 37 through the interface circuits 15 and 31 which induce the supplemental motions $\Delta y$ and $\Delta x$ in the screws 6 and 22 which respectively move the plate-carrier 4 and the observation optical unit 20.

e. two stepping motors 40 and 41 situated on the tracing table and controlled through the circuits 42 and 43. The motors 40 and 41, through suitable gears trains, move the carriage X and Y of the tracing table, thus allowing the drawing of the level curves and planimetry.

f. a pencil-raise device 45 (see for example, U.S. Pat. No. 3,614,410 or Brit. Pat. No. 876,740) which is actuated through the electronic circuits 46 or automatically by the computer 37 or manually by the operator.

g. four displays 47, 48, 49, 50 controlled by the computer 37 through the respective electronic circuits 51, 52, 53, 54 and on which decimal numbers are made visible with seven digits plus the sign, the values of the plate-coordinates $y_2, x_2, y_1, x_1$, respectively measured by the screws 6, 7, 22, 23 and forwarded to the computer 37 by means of the shaft encoders 16, 17, 32, 33 connected to the same screws. Alternative to the values of the plate-coordinates, on three of the four displays (the fourth remaining unlighted) are made visible the ground-coordinates $E_p N_p Q_p$ of the point P corresponding to the two homolog images $I_1 I_2$.

h. A teletype-writer machine 55 with a tape-puncher which is designed both to forward instructions to the computer, and to record in hand copy on the paper roll and in code on the punched tape, the values of plate-coordinates $y_2 x_2 y_1 x_1$, both in alternative the values of the ground coordinates $E_p, N_p, Q_p$ of the point P corresponding to the two homolog images $I_1 I_2$.

Of the aforesaid data input and output members, the following control electronic circuits are a part thereof:

i. an electronic circuit 56 by means of which the computer 37 controls the input into the computer of the data coming from the interface circuits 18, 19, 34, 35 of the shaft encoders 16, 17, 32, 33 and from the keyboard 38.

j. an electronic circuit 57, by means of which the computer 37 controls the forwarding of the data to the interface circuit 46 of the pencil-raise-turn device 45, to the interface circuits 42, 43, 15, 31 of the motors 40, 41, 14, 30 to the interface circuits 51, 52, 53, 54 of the four displays 47, 48, 49, 50.

An appropriate calculation program, based on the disclosed formulae performs about 50 times each second, the following operations:

1. reading of the plate-coordinates $x_1 y_1 x_2 y_2$;
2. calculation of the value $y'$ and thus of the value $\Delta y = y_2 - y'_2$ which is sent to the stepping motor (in the operation for the contour lines, two values $x'_2$ and $y'_2$ are calculated and sent to the two stepping motors the amounts $\Delta x = x_2 - x'_2$ and $\Delta y = y_2 - Y'_2$).
3. calculation and visualization on the displays of the coordinates $E_p N_p Q_p$ of the stereoscopically collimated point in the two photograms;
4. forwarding the values $\Delta E, \Delta N$, that is the variations of the coordinates E, N which are between two program cycles, to the stepping motors 40, 41 of the drawing table.

The device thus allows the tracing of topographic maps according to air-photogrammatic methods, allows the survey of the ground by points with the recording of the coordinates E, N, Q by means of punching tapes and, with hard copy by means of the teletype-writer machine, allows effecting air triangulation of surveys and thus is assimilable as an operation in a conventional photogrammetric plotter.

The stepping motors used in the above are commercially available, as shown for example, in the PHILIPS catalog entitled Stepping Motors (Convert Electrical Data Into Mechanical Steps).

A suitable computer is shown for instance, in the text of The Value of Power; Fourth Edition; prepared for General Automation Inc.; Adam Osborne and Associates, Inc. Berkeley, California. In the above, use was made of a Model PDP 11 computer of Digital Electronic Corp.

What is claimed is:

1. Apparatus comprising:
   a. computer means to supply numerical data;
   b. operator controlled means for effecting stereoscopic photogram exploring motions relative to two stereoscopically related photograms;
   c. first interface means for transducing said motions into signals which are fed into said computer means; said computer means converting said signals into numerical data and correcting said numerical data for parallax in real time;

said computer means in converting said signals into corrected numerical data calculating supplemental values relating to a further motion in said operator controlled means for the elimination in real time of parallax; and d. second interface means for receiving the thusly corrected numerical data from said computer means and transducing the same into operation of said operator controlled means for visual correction whereby there is obtained a rigorous orientation of observed points.

2. Apparatus as claimed in claim 1 comprising planar trace means controlled by said computer through said second interface means for the graphic plotting of said corrected numerical data.

3. Apparatus as claimed in claim 1 wherein said operator controlled means includes first displacement means for manually displacing one of said photograms in a direction corresponding to one of two coordinates and second displacement means for displacing the other of said photograms in correspondence with said one photogram, said first interface means feeding to said computer means signals corresponding to the displacements of both said photograms, said second interface means further controlling said second displacement means in response to said supplemental values to eliminate the influence of said parallax in real time.

4. Apparatus as claimed in claim 3 wherein said first interface means includes pulse generators for generating pulses in correspondence with the displacement of both said photograms and said second interface means includes a step motor and means coupling said step motor to one of said displacement means for driving the latter independently of the other of said displacement means, said step motor being driven in accordance with said supplemental values.

5. Apparatus as claimed in claim 3 comprising display means for displaying the signals fed by said first interface means to said computer means.

6. Apparatus as claimed in claim 1 wherein said operator controlled means includes first displaceable optic means for being manually displaced and scanning one of said photograms in a direction corresponding to one of two coordinates and second displaceable optic means for being displaced in correspondence with said first displaceable optic means, said first interface means feeding to said computer means signals corresponding to the displacement of both said photograms, said second interface means controlling said second displaceable optic means in response to said supplemental values to eliminate the influence of said parallax in real time.

7. Apparatus as claimed in claim 6 wherein each said optic means includes a punctiform collimation mark.

8. Apparatus as claimed in claim 6 wherein said first interface means includes pulse generators for generating pulses in correspondence with the displacement of both said optic means and said second interface means includes a step motor and means coupling said step motor to one of said optic means for driving the latter independently of the other of said optic means, said step motor being driven in accordance with said supplemental values 9. Apparatus as claimed in claim 6 comprising display means for displaying the signals fed by said first interface means to said computer means.

10. Apparatus as claimed in claim 1 comprising further operator controlled means for supplementing one of said motions.

11. Apparatus as claimed in claim 10 wherein said further means is a pedal-operated means.

12. Apparatus as claimed in claim 1 wherein said computer means includes means for correcting said numerical data for y parallax.

13. A method comprising supporting stereoscopically related photograms on a pair of stereocomparator carriage devices, manually displacing the pair of stereocomparator carriage devices and a pair of optical scanning devices for effecting stereoscopic photogram exploring motions, measuring the displacements of the carriage and optical scanning devices, calculating parallax corrections based on the thusly obtained measurements for at least one of said pairs and adjusting the latter said pair for parallax, storing the displacement and corrections, and graphically plotting the displacement and corrections to obtain a planemetric trace in which the effects of parallax are eliminated.

14. A method as claimed in claim 13 wherein the calculating is effected according to $$Y_p = Z_p \frac{x_1 a_{12} + y_1 a_{22} - p a_{32}}{x_1 a_{13} + y_1 a_{23} - p a_{33}}$$

wherein $p$ is focal length of the camera taking the photograms, $A_{ij}$ where $i$ is one through three and $j$ is one through three are direction cosines, $Z_p$ is the Z coordinate of point P, $Y_p$ is the y model coordinate of point P, and $x$ and $y$ are plate coordinates.

* * * * *